United States Patent
Chitrapu

(10) Patent No.: US 7,155,208 B2
(45) Date of Patent: Dec. 26, 2006

(54) USER CONTROLLED TRANSACTION ARCHIVING

(75) Inventor: Prabhakar R. Chitrapu, Blue Bell, PA (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 11/022,704

(22) Filed: Dec. 27, 2004

(65) Prior Publication Data

US 2005/0192040 A1    Sep. 1, 2005

Related U.S. Application Data

(60) Provisional application No. 60/545,605, filed on Feb. 18, 2004.

(51) Int. Cl.
  *H04L 12/58* (2006.01)
  *H04M 1/725* (2006.01)
  *H04M 3/42* (2006.01)

(52) U.S. Cl. .............................. 455/412.1; 455/414.1; 455/566; 455/412.2; 379/88.22; 379/88.14; 379/67.1

(58) Field of Classification Search ............... 455/412, 455/550, 412.1, 566, 557, 432, 435, 412.2, 455/413, 415, 416, 517, 518; 379/88.22, 379/88.14, 67.1, 88.01, 88.04, 88.12, 88.16, 379/88.19, 88.2
See application file for complete search history.

(56) References Cited

U.S. PATENT DOCUMENTS

| | | | |
|---|---|---|---|
| 6,222,909 B1* | 4/2001 | Qua et al. ................. | 379/88.22 |
| 6,385,306 B1* | 5/2002 | Baxter, Jr. ................ | 379/88.13 |
| 6,812,954 B1* | 11/2004 | Priestman et al. ........ | 348/14.01 |
| 2001/0016491 A1* | 8/2001 | Imura et al. ................ | 455/432 |
| 2001/0041559 A1* | 11/2001 | Salabaschew ............... | 455/412 |
| 2002/0051181 A1* | 5/2002 | Nishimura .................. | 358/1.15 |
| 2004/0014456 A1* | 1/2004 | Vnnen ......................... | 455/413 |
| 2004/0136503 A1* | 7/2004 | Kass .......................... | 379/67.1 |
| 2004/0203608 A1* | 10/2004 | Osann ...................... | 455/412.1 |
| 2005/0107071 A1* | 5/2005 | Benco et al. ................ | 455/413 |

* cited by examiner

*Primary Examiner*—Edan Orgad
(74) *Attorney, Agent, or Firm*—Volpe and Koenig, P.C.

(57) ABSTRACT

A connection between a wireless transmit/receive unit (WTRU) and another node through a wireless network is established. The connection is used for communication. A user input is received. In response to the received user input, a communication through the connection is recoded while the WTRU still communicates the communication to a user of the WTRU. The recorded communication is retrieved and the recorded communication is communicated to the user at a later time.

8 Claims, 4 Drawing Sheets

USER CONTROLLED TRANSACTION ARCHIVING

CROSS REFERENCE TO RELATED APPLICATION(S)

This application claims priority from U.S. Provisional Application No. 60/545,605, filed on Feb. 18, 2004, which is incorporated by reference as if fully set forth herein.

FIELD OF INVENTION

The present invention relates to wireless communications. In particular, the invention relates to archiving data in such systems.

BACKGROUND

In voice based wireless communications, users frequently exchange detailed information between each other. To illustrate, an individual may require driving directions to a specific location. The individual typically will call that location or an individual that knows the location. The called individual (caller) will verbally provide the individual with directions. The calling individual will typically either write the directions down, such as on a sheet of paper or will try to remember the directions. In some situations, it may be difficult or almost impossible for the caller to write-down the direction. The caller may not have a writing utensil or may be preoccupied, such as by driving a vehicle.

Accordingly, it is desirable to have alternate approaches to storing wireless information.

SUMMARY

A connection between a wireless transmit/receive unit (WTRU) and another node through a wireless network is established. The connection is used for communication. A user input is received. In response to the received user input, a communication through the connection is recoded while the WTRU still communicates the communication to a user of the WTRU. The recorded communication is retrieved and the recorded communication is communicated to the user at a later time.

BRIEF DESCRIPTION OF THE DRAWING(S)

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment.

Figure 1:
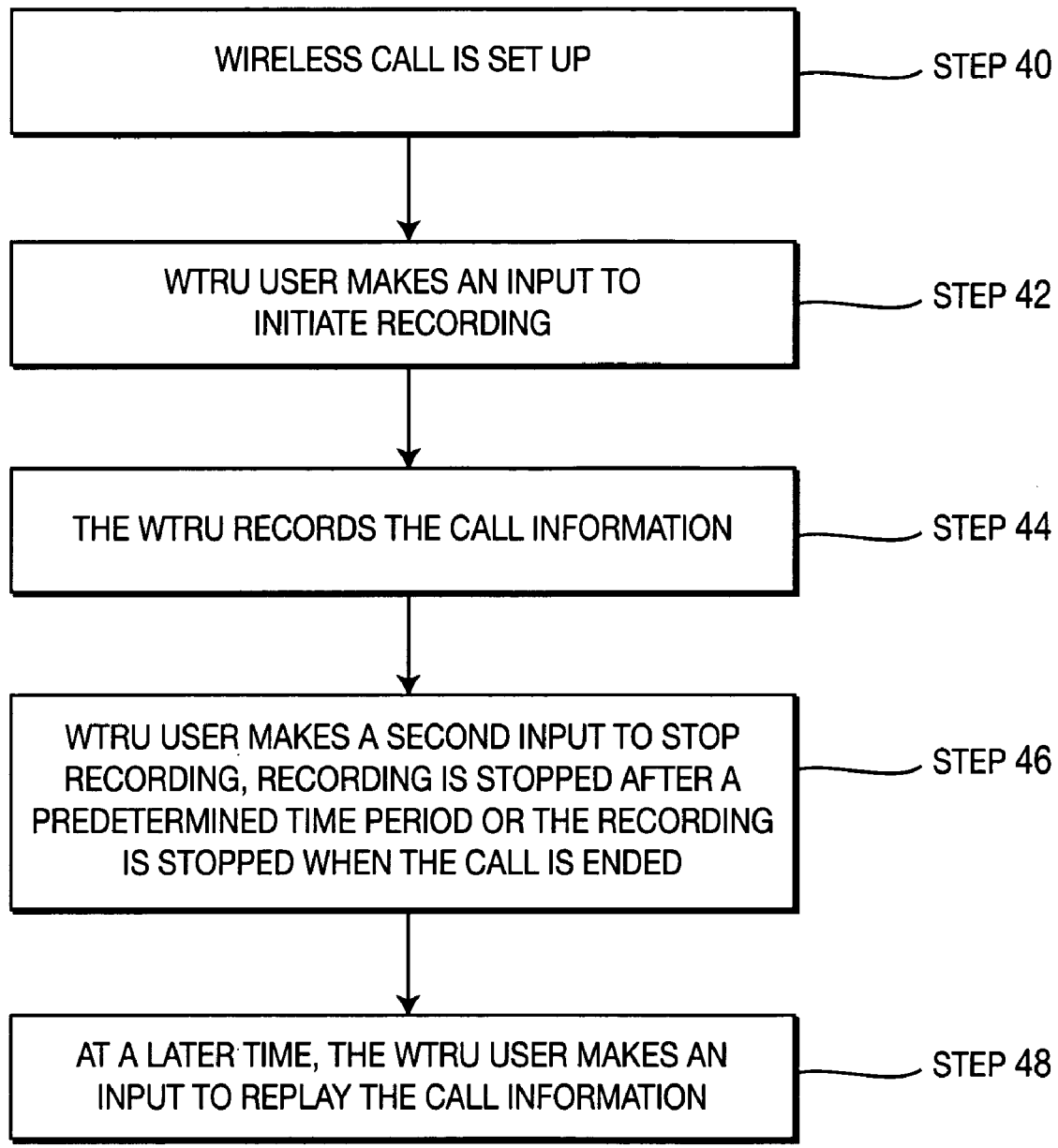
FIG. 1 is a flow diagram of WTRU storage of wireless voice or data communications.

FIG. 1 is a simplified flow diagram of WTRU storage of voice or data communications. After a wireless call is set up between the WTRU and the source (step 40), the user of the WTRU will provide an input to initiate the recording of information from a source or source node (step 42). The information may be voice information, text messaging, video (such as video phone), mixed media (voice, data, image and video), among others. The source may be provided by a called or calling individual, such as provided voice driving directions, or may be an automated source, such as an automated voice statement of a banking account balance. The automated information may also be from a data or application server.

The input may be one of multiple types, including keypad input (press the "#" key), special input button, executed icon/menu entry or voice command. The information is stored within the WTRU or is stored to a device connected to the WTRU (step 44). While the information is being recorded, it is also being outputted to the WTRU user. After the desired information is recorded, the WTRU user makes a second input terminating the recording. Alternately, the recording may cease after a predetermined time period or when the call is ended (step 46). At a later time, the WTRU user can make an appropriate input, such as by selecting a menu entry, into the WTRU to replay the recorded information (step 48).

To illustrate, the WTRU user asks an individual at the source for driving directions. When the driving directions are spoken, the WTRU user presses the "#" key to record the directions. When the directions are complete, the WTRU user presses the "#" key to cease the recording. At a later point, the WTRU user may make the appropriate keypad entries to navigate a menu to have the recorded directions replayed.

The recorded information may be information from the source or information from the source and WTRU. To illustrate, to get driving directions, the user only needs information from the source. Conversely, if a telephone interview is occurring or a text messaging session, both the WTRU and source information are typically needed to provide the information in proper context. The WTRU may be configured to only record from the source information, only record both the source and WTRU information or selectably record source only and source and WTRU information. The source only/source and WTRU recording modes are selected either by a user input or by the type of communication, such voice being source only and text messaging being both source and WTRU.

Figure 2:
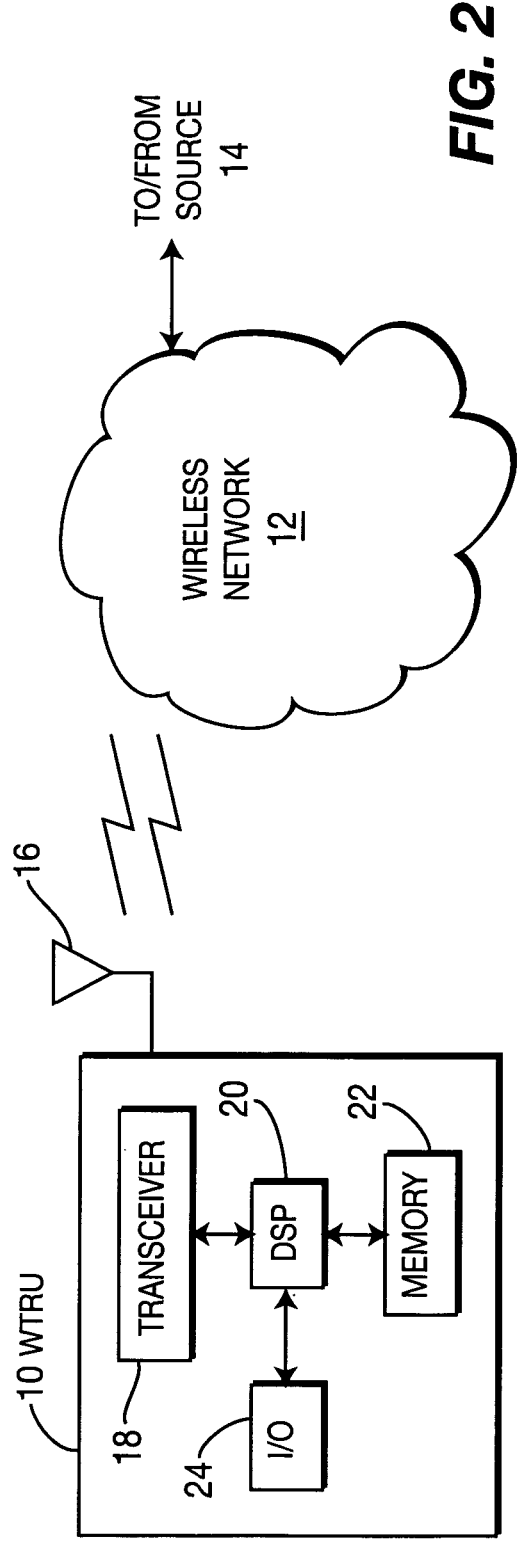
FIG. 2 is a simplified diagram of an embodiment of WTRU storage of wireless voice or data communications.

FIG. 2 is a simplified diagram of an embodiment of WTRU information storage. A WTRU 10 has a transceiver 18 for transmitting and receiving information wirelessly using an antenna or antenna array 16. The WTRU 10 wirelessly communicates with a wireless network 12. The wireless network 12 may be a cellular type network, such as general packet radio service (GPRS), global system for mobile communications (GSM), universal mobile terrestrial system (UMTS), CDMA2000, or non-cellular network, such as a wireless local area network (WLAN) or a wireless metropolitan area network (WMAN), among others.

The wireless network 12 sends and receives information from the source 14, which may be in the wireless network 12, in another wireless network or in a non-wireless network, such as a public switched telephone network (PSTN) or the Internet. Information received and sent to the source 14 by the WTRU 10 is processed, such as by a digital signal processor (DSP) 20. When the user desires to record a communication, the user inputs a corresponding input via the input/output device (I/O) 24. After receipt of the command, the DSP 20 stores the desired information to an associated memory 22. Although the memory 22 is shown in FIG. 2 as being in the WTRU 10, it may be external to the WTRU 10. When the user wishes to replay the recorded information, the user inputs a corresponding input via the I/O device 24 and the DSP 20 sends the information stored in the memory 22 to the I/O device 24 to be replayed to the user.

Figure 3:
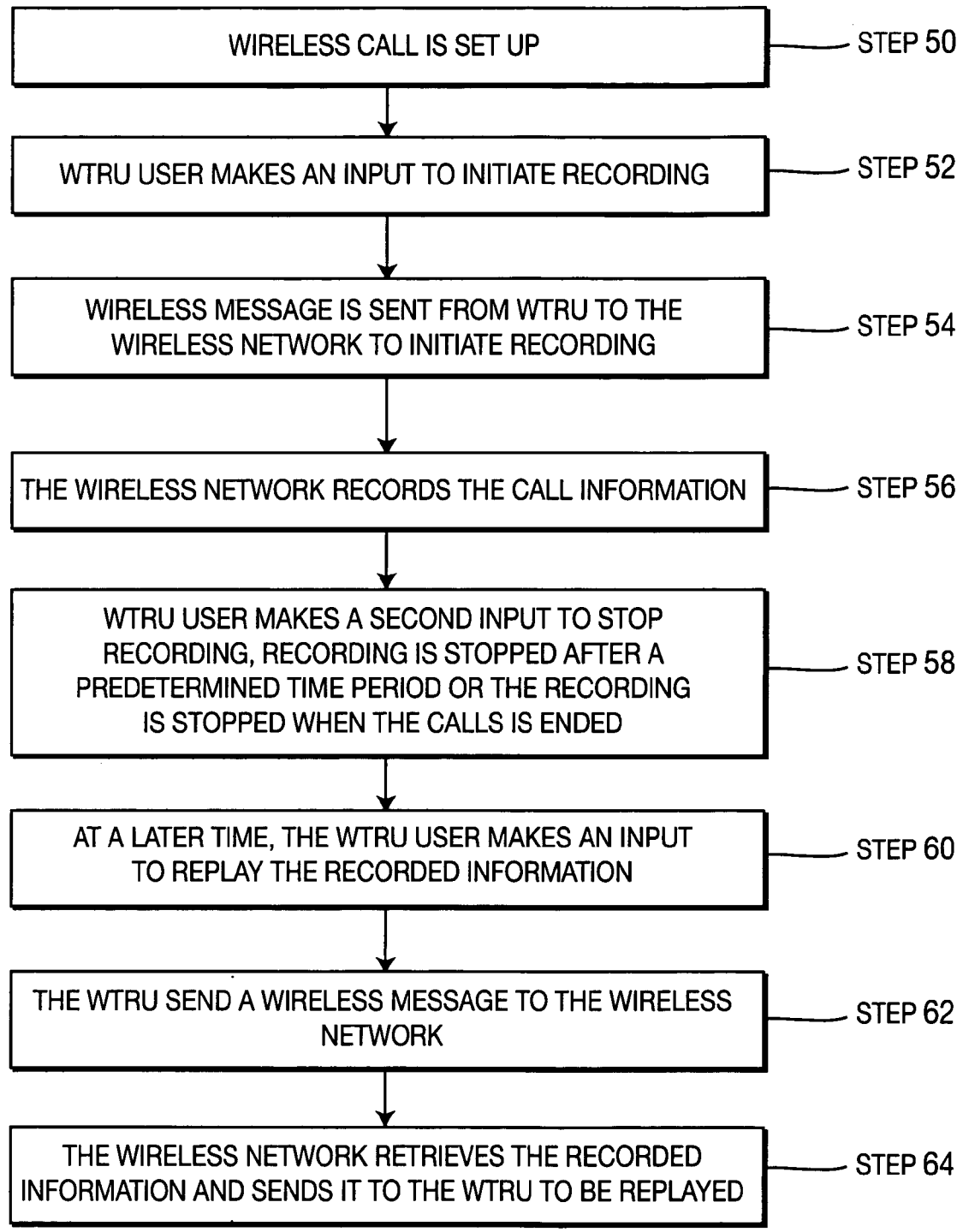
FIG. 3 is a flow diagram of wireless network storage of wireless voice or data communications.

FIG. 3 is a simplified flow diagram of wireless network storage of voice or data communications. After a wireless call is set up between the WTRU and the source via a wireless network (step 50), the user of the WTRU will provide an input to initiate the recording of information from a source (step 52). A wireless message is sent by the WRTU to the wireless network to begin recording of the information (step 54). The information is stored within the wireless network (step 56). The recorded information may be only from the source or from both the WTRU and source. While the information is being recorded, it is also being outputted to the WTRU user. After the desired information is recorded, the WTRU user makes a second input terminating the recording. Alternately, the recording may cease after a predetermined time period or when the call is ended (step 58). At a later time, the WTRU user can make an appropriate input into the WTRU to replay the recorded information (step 60). The WTRU sends a wireless message to the wireless network requesting the information be replayed (step 62). The wireless network retrieves the recorded information and sends it to the WTRU to be replayed (step 64).

Figure 4:
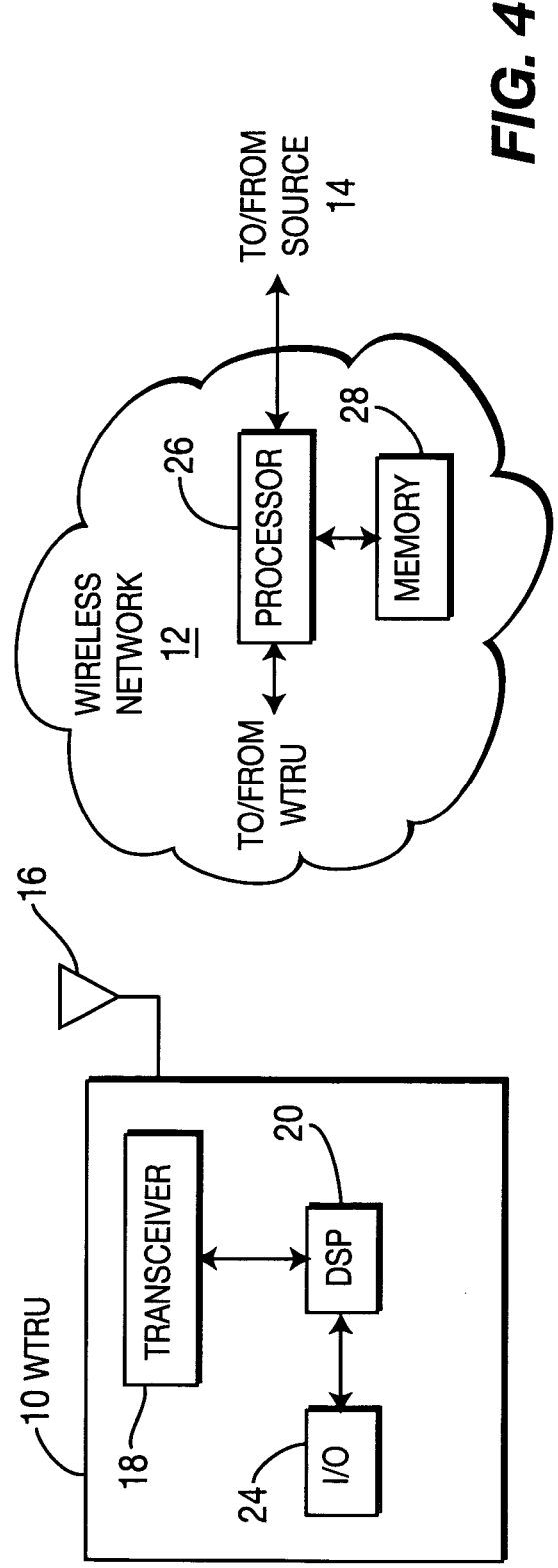
FIG. 4 is a simplified diagram of an embodiment of wireless network storage of wireless voice or data communications.

FIG. 4 is a simplified diagram of an embodiment of wireless network information storage. A WTRU 10 has a transceiver 18 for transmitting and receiving information wirelessly using an antenna or antenna array 16. The WTRU 10 wirelessly communicates with the wireless network 12. The wireless network 12 has a processor 26 and a memory 28, among many other infrastructure components.

The wireless network 12 sends and receives information from the source 14. Information received and sent to the source 14 by the WTRU 10 is processed, such as by a digital signal processor (DSP) 20. When the user desires to record a communication, the user inputs a corresponding input via the input/output device (I/O) 24. After receipt of the command, the DSP 20 sends a message to the wireless network 12 via transceiver 18 and antenna/antenna array 16 requesting that the information be stored. Upon receipt of the message by the wireless network processor 26, the information is stored to the wireless network memory 28.

To retrieve the information, the user makes another input and the WTRU 10 generates a message, via the DSP 20, transceiver 18 and antenna/antenna array 16, to the wireless network 12 requesting that information. The processor 26 within the wireless network 12 upon receipt of the message retrieves the stored information from the memory 28 and sends it to the WTRU 10. The message is received by the transceiver 18, processed by the DSP 20 and output to the user via the I/O device 24.

One advantage to the wireless network storage of the information is that the stored information is not impacted by impairments of the wireless channel between the wireless network and WTRU. To illustrate, if during a voice communication, the user experiences drop-outs, the information stored in the network will not have the drop-outs and the message can be replayed when the channel conditions improve.

Figure 5:
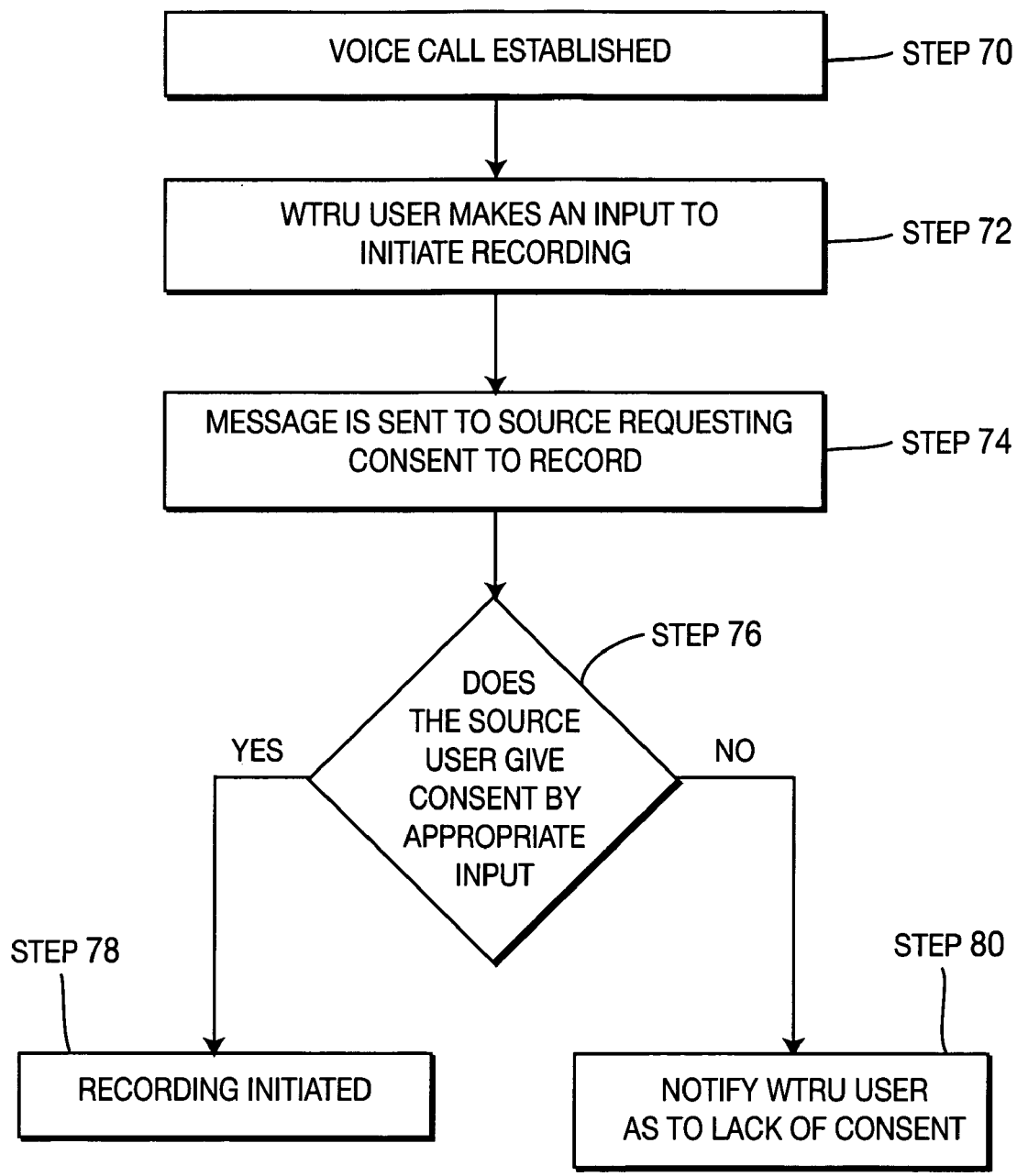
FIG. 5 is a flow diagram of voice recording with second party consent.

In many legal jurisdictions consent is required by an individual to have their voice communications recorded. FIG. 5 is a flow diagram of voice recording with second party consent. After establishment of the voice call (step 70), the WTRU user makes an appropriate input to have the call recorded, either by the WTRU or wireless network (step 72). A message is sent to the source requesting the source to provide appropriate consent, such as a voice message saying "to consent to the recording of this telephone call, please depress the pound key" (step 74). If the source user makes the appropriate input (step 76), the recording is initiated (step 78). If the appropriate input is not made (step 76), the WTRU user is notified of the lack of consent, such as by a corresponding display or voice message (step 80).

Although the WTRU components in FIGS. 2 and 3 are illustrated as separate components, the components may be on a single integrated circuit (IC), such as an application specific integrated circuit (ASIC), multiple ICs, discrete components or a combination of discrete components and IC(s).

What is claimed is:

1. A method of recording a communication conducted over a wireless connection between a wireless transmit/receive unit (WTRU) and a wireless network, comprising:
    establishing a communication connection between a wireless transmit/receive unit (WTRU) and another node that includes the wireless connection between the WTRU and the wireless network and communicating using the communication connection;
    sending a user input by the WTRU to the wireless network to request the other node to provide consent to recording the communication;
    the wireless network receiving the user input and requesting the other node to provide consent to recording the communication;
    the other node receiving the request for consent and sending said consent to the wireless network;
    in response to the wireless network receiving said consent, recording the communication conducted over the communication connection; and
    retrieving the recorded communication and communicating the recorded communication to the user at a later time.

2. The method of claim 1 wherein a communication type includes at least one of data, text, video, image and voice, a communication source is at least one of the WTRU and the other node, and the communication is selectably recorded according to at least one of the communication type and the communication source.

3. The method of claim 1 wherein recording the communication ceases responsive to one of the WTRU user making a second input to cease recording, a predetermined time period elapsing, and the communication ending.

4. A wireless transmit/receive unit (WTRU) comprising:
    a transceiver configured to conduct a communication with another node over a communication connection that includes a wireless connection with a wireless network;
    a digital signal processor (DSP) connected to the transceiver, to the connector and to an input/output device, configured to receive a first user input from the input/output (I/O) device and responsive thereto to send a signal to request permission from the other node to record the communication and responsive to receiving said permission, to initiate recording the communication; and further configured to receive a second user input from the I/O device and responsive thereto to retrieve the recorded communication at a later time; and the I/O device configured to receive the communication from the DSP and output the communication in a form suitable for a user and the I/O device is configured to accept the user input from the user and output the user input to the DSP.

5. The WTRU of claim 4 wherein a communication type includes at least one of data, text, video, image and voice, a communication source is one of the WTRU and said another node, and the WTRU further comprises a selector for selectably recording the communication according to the communication type and the communication source.

6. The WTRU of claim 4 wherein the DSP is further configured to send a signal to cease recording the communication responsive to one of the WTRU user making a second input to cease recording, a predetermined time period elapsing, and the communication ending.

7. A system for recording a communication conducted over a wireless connection between a wireless transmit/receive unit (WTRU) and another node via a wireless network, comprising:

the WTRU comprising:
 a transceiver configured to conduct a communication with the other node over a communication connection that includes a wireless connection with the wireless network;
 a digital signal processor (DSP) configured to receive a user input from an input/output (I/O) device and send a signal to initiate recording the communication; and further configured to receive a user input from an I/O device and send a signal to retrieve the recorded communication at a later time; and
 the I/O device configured to receive the communication from the DSP and output the communication in a form suitable for a user and the I/O device configured to accept the user input from the user and output the user input to the DSP; and the wireless network, communicatively coupled to the WTRU, configured to conduct the communication between the WTRU and the other node comprising:
 a transceiver configured to conduct a communication with the WTRU over a wireless connection; and
 a processor configured to receive a signal from the WTRU and responsive thereto to request permission from the other node to record the communication, and further configured to receive permission from the other node and responsive thereto, to initiate recording the communication;

the other node, configured to communicate with the network and to receive therefrom a request for permission to record the communication, and responsive to the request to provide said permission; and a memory communicatively coupled to one of the WTRU and the network, configured to store the communication responsive to said permission, and to provide the stored communication at a later time responsive to a signal to retrieve the recorded communication.

8. The system of claim 7, wherein in the case of said permission not being provided in response to a request for permission, the user of the WTRU is notified that permission has not been provided.

* * * * *